(12) United States Patent
Iwasaki

(10) Patent No.: US 7,344,333 B2
(45) Date of Patent: Mar. 18, 2008

(54) BUMPING POST BLOCK AND ANCHOR HOLDER AND HOLE CAP USED FOR THE SAME AND BUMPING POST

(75) Inventor: Shoichi Iwasaki, Kawaguchi (JP)

(73) Assignee: Saicon Kogyo Co., Ltd., Saitama (JP)

( * ) Notice: Subject to any disclaimer, the term of this patent is extended or adjusted under 35 U.S.C. 154(b) by 98 days.

(21) Appl. No.: 10/548,079

(22) PCT Filed: Sep. 22, 2004

(86) PCT No.: PCT/JP2004/013789

§ 371 (c)(1),
(2), (4) Date: Sep. 6, 2005

(87) PCT Pub. No.: WO2006/033139

PCT Pub. Date: Mar. 30, 2006

(65) Prior Publication Data

US 2006/0251492 A1    Nov. 9, 2006

(51) Int. Cl.
*E01C 11/22*    (2006.01)
(52) U.S. Cl. ............... 404/7; 411/98; 411/128
(58) Field of Classification Search ............ 404/6, 404/7; 411/81, 85, 98, 128, 511; 403/21, 403/351
See application file for complete search history.

(56) References Cited

U.S. PATENT DOCUMENTS

| 592,845 | A | * | 11/1897 | Wallace et al. | ............... 411/88 |
|---|---|---|---|---|---|
| 646,059 | A | * | 3/1900 | Stanley | ........................ 411/98 |
| 652,487 | A | * | 6/1900 | Powers | ....................... 238/209 |
| 1,685,449 | A | * | 9/1928 | Durand | ........................ 404/16 |
| 1,755,443 | A | * | 4/1930 | Hartzler et al. | ............... 404/10 |
| 1,798,467 | A | * | 3/1931 | Hartzler et al. | ............... 404/15 |
| 1,830,319 | A | * | 11/1931 | Hartzler et al. | ............... 404/10 |
| 2,159,752 | A | * | 5/1939 | Shaw | ........................... 404/5 |
| 2,337,793 | A | * | 12/1943 | Abbott | ........................ 404/16 |
| 2,655,225 | A | * | 10/1953 | Harris | ........................... 404/6 |

(Continued)

FOREIGN PATENT DOCUMENTS

JP    60-30366    9/1985

(Continued)

OTHER PUBLICATIONS

Korean Office Action issued Aug. 22, 2007 regarding Korean Patent Application Ser. No. 10-2006-7023136, which is a foreign counterpart to the present U.S. application.

*Primary Examiner*—Gary S Hartmann
(74) *Attorney, Agent, or Firm*—Wenderoth, Lind & Ponack, L.L.P.

(57) ABSTRACT

An anchor bolt bolt does not easily jump up even if a tire hits a bumping post. A through hole for inserting the anchor bolt into the bumping post is formed by embedding a cylindrical anchor holder. The anchor holder has a cylinder for receiving the anchor bolt and a head for containing the head of the anchor bolt. A plurality of projecting parts, forming a protruding line, prevent the head of the anchor bolt from jumping up. The projecting parts are positioned at the head of the holder. Since the head of the bolt is pressed down from above by the protruding line, the head of the bolt will not jump up over the projecting parts.

16 Claims, 7 Drawing Sheets

U.S. PATENT DOCUMENTS 4,971,475 A * 11/1990 Castonguay et al. ........... 404/7
5,033,905 A *  7/1991 Schmidt et al. ................ 404/6
5,181,793 A *  1/1993 Dekel ........................... 404/4
7,241,094 B1 * 7/2007 Potts et al. .................... 411/85

FOREIGN PATENT DOCUMENTS

| JP | 7-19525 | 4/1995 |
| JP | 9-158136 | 6/1997 |
| JP | 11-159182 | 6/1999 |

* cited by examiner

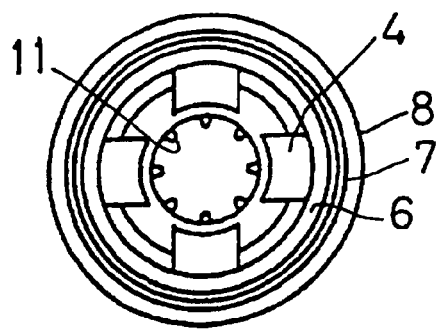
Fig. 1(a)
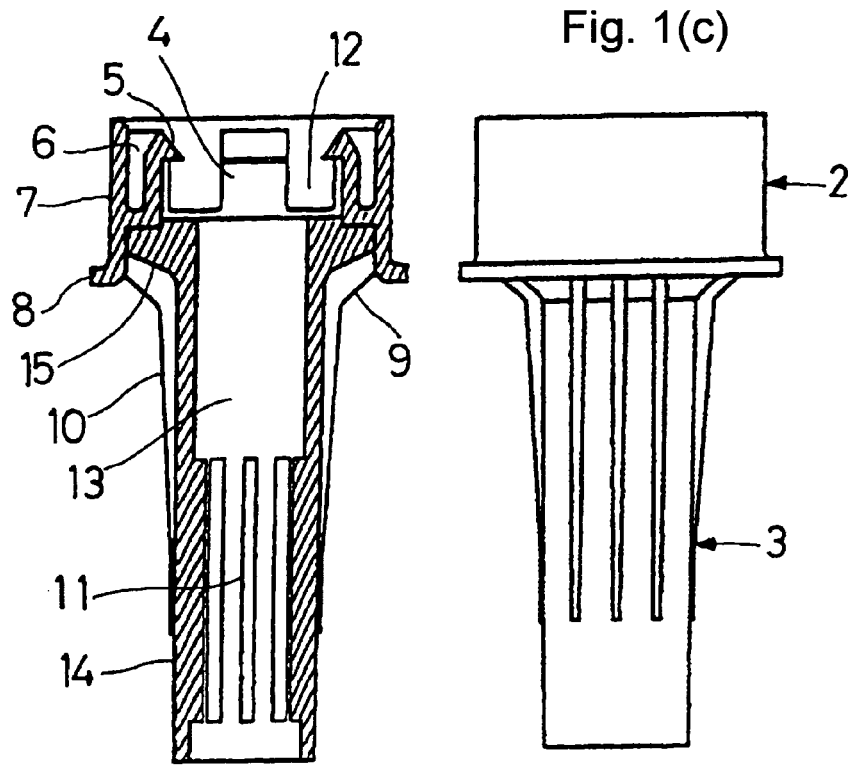
Fig. 1(b)
Fig. 1(c)
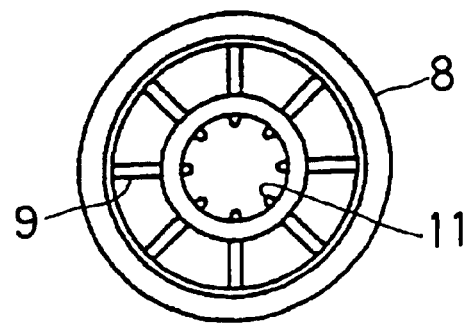
Fig. 1(d)

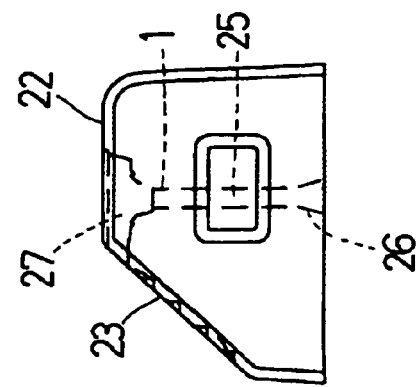
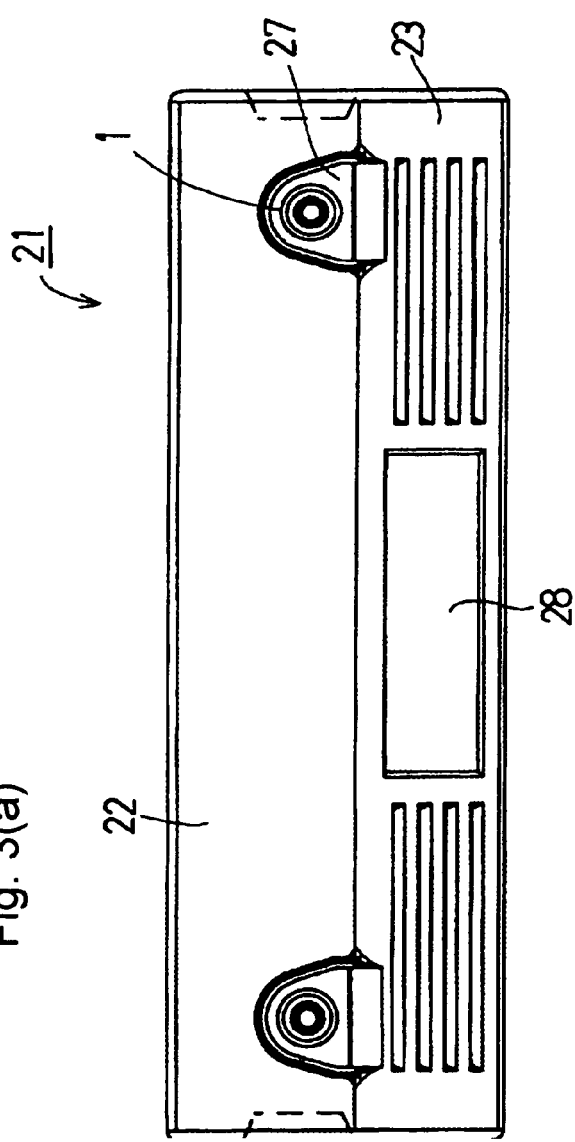
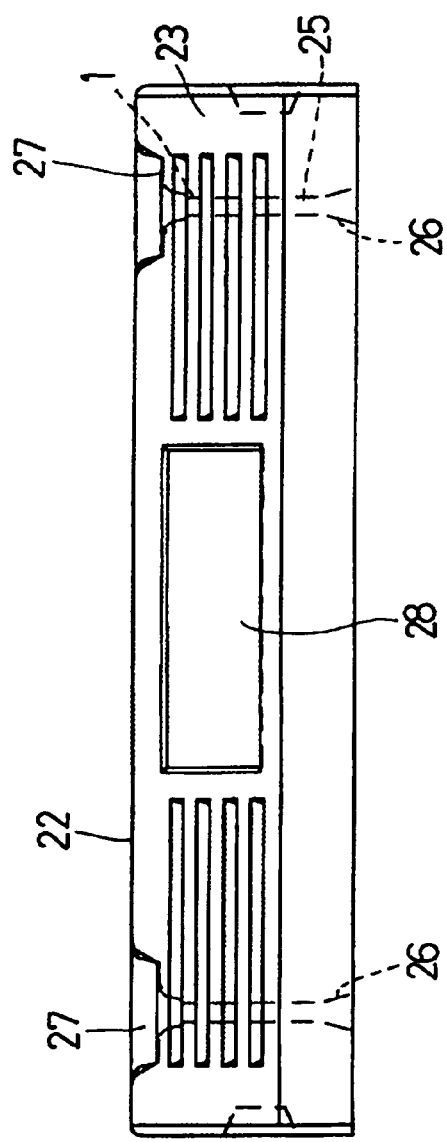

BUMPING POST BLOCK AND ANCHOR HOLDER AND HOLE CAP USED FOR THE SAME AND BUMPING POST

BACKGROUND OF THE INVENTION

1. Technical Field

The present invention relates to a bumping post block, which is established on an installation surface such as a car park and used for stopping a car at a predetermined position, an anchor holder and hole cap used for this and a bumping post using the above.

2. Description of the Related Art

With the bumping post block established on an installation surface such as a car park for the purpose of stopping a car at a predetermined position, various means have been considered for fixing the block on to the installation surface so as not to slip or fall even when it is hit by a tire. The block is required to be crashproof, such that the fixing means of the block does not become loose even when it is hit by a tire with great force, and the improvement of workability is also needed. In the prior art, such a method is used, in which a hole is made on the installation surface in advance, an anchor pin, which is pre-embedded in the block, is inserted therein, and the hole is filled with mortar or the like. With this method, however, there remain many problems regarding the positioning of the anchor pin, crashproof and workability, therefore, a new method is created, which employs a fixing means such that a through-hole is provided in the block and an anchor pin is driven therein into the installation surface. For example, in the Japanese Patent Laid Open No. 1999-159182, an enhanced crashproof structure is realized by adopting a configuration (such as a tapered configuration), in which the head of the anchor bolt and a predetermined portion of the head of the anchor holder is fitted together.

According to the Japanese Patent Laid Open No. 1999-159182, the block is surely hard to be moved when compared with the existing bumping post block and a fixing-performance is enhanced, however, there still leaves room for improvement in the fitting condition between the anchor bolt and the anchor holder, therefore, when a tire hits the block with great force, there is a problem that the bolt jumps over to break a muffler and a bumper and the like.

SUMMARY OF THE INVENTION

The purpose of the present invention is to provide an anchor holder having a structure that an anchor bolt does not easily jump over when a tire hits the block, a bumping post block embedded the above, a hole cap being used thereby and a bumping post employing the above.

The present invention is an approximately cylindrical anchor holder embedded in a bumping post block for forming a through-hole in up-and-down direction to insert an anchor bolt fixing said bumping post block, comprising a cylinder of the holder for being inserted by said anchor bolt and a holder head, which is located thereover, containing the head of said anchor bolt, wherein there are provided a plurality of projection parts having a protruding line in the head of said holder, which prevents said anchor bolt from jumping up by contacting with the upper surface of the head of said anchor bolt when said anchor bolt is about to jump up.

The head of the anchor bolt is the part which is provided on the upper part of a shank, and circularly evaginating from the shank. Since the head of the anchor bolt is locked by the protruding line, it does not jump over the projection parts in the anchor holder. That is, in the case of inserting the anchor bolt into the anchor holder by such as driving-in from above, when the head of the anchor bolt passes through the protruding line portion, the portion is once spread outward for the head of the bolt to pass through, and after passing, protruding line of the projection parts is placed on the head of the bolt or pushed down from above. Because of this, flexibility of a certain degree as well as strength are required for the anchor holder, therefore, it is preferable that elastic and somewhat soft resin, such as polypropylene or polyethylene, is used. As long as the protruding line can prevent the head of the anchor bolt from jumping up, it is possible to adopt any shape and any numbers of the protruding line.

The anchor holder also includes a peripheral groove provided between the projection parts and the peripheral wall of the head of the the holder to fit the foot part of a hole cap.

By providing the peripheral groove and fitting the foot part of the hole cap therein the head of the anchor bolt become harder to jump over the projection parts. That is, since the projection parts have to once make the head of the anchor bolt pass through, flexibility in such a degree as to be able to spread outward is required. However, the anchor holder according to claim 1 alone does not perform the function of the protruding line against a strong impact, resulting in a possibility that the head of the bolt might jump over the projection parts. Then, the peripheral groove provided between the projection parts and the peripheral wall set up around the outermost part of the head of the holder plays a role of not only providing a physical space, in which the projection spreads outward, but also locking the projection parts not to move outward by fitting the foot part of the hole cap into the peripheral groove after the head of the bolt passed. Thus, the head of the bolt can be prevented from jumping up.

The anchor holder has ribs provided on the inner cylindrical wall of the holder.

It is preferable that the ribs are provided axially. When inserting the anchor bolt into the anchor holder, the bolt is driven while crushing the ribs, therefore, the adhesion between the anchor holder and the anchor bolt is enhanced. Thus, the anchor bolt becomes harder to jump up all the more. In addition, from the pressure test, it is found that there is a difference of from 20% to 30% in the strength of the block used between the case in which there is a gap (bumpy movement) between the anchor holder and the anchor bolt, and the case in which there is no gap (bumpy movement) between them and they are closely glued together. Since, by being inserted while crushing the ribs, the anchor bolt can play a role to enhance adhesion, the outer diameter of the shank of the anchor bolt can be a little smaller than the inner diameter of the anchor holder and the bolt allows some latitude in the outer diameter of the shank.

The outer diameter of the cylinder of the holder right under the neck part of the holder, which is the boundary between the head of the holder and the cylinder of the holder, is smaller than the outer diameter of the lower end of the head of the anchor bolt.

By making the outer diameter of the cylinder of the holder right under the neck part of the holder smaller than the outer diameter of the lower end of the anchor bolt, concrete is filled right under the outer edge of the head of the anchor bolt. Thereby, since the impact caused by driving the anchor bolt can be stopped not only by the resin part of the holder but the concrete part right under the outer edge of the head of the bolt, the strength of the anchor bolt can be enhanced and the damage of the anchor holder can be prevented when the anchor bolt being driven in.

In the anchor holder of the present invention, the outer peripheral diameter of the cylinder of the holder downwardly tapers off.

By tapering off like this, when driving the anchor bolt, the downward force exerted on the anchor holder is converted into the force, which tightens the cylinder of the holder, and the force can be stopped by the entire cylinder of the holder. The force, which tightens the cylinder of the holder acts as a force, which enhances the fitting between the anchor bolt and the anchor holder. Thus, the anchor bolt becomes harder to jump up all the more.

The anchor holder of the present invention also has a cylindrical joint part is jointed at the lower end of the cylinder of the holder.

By jointing such a joint part, while utilizing an anchor holder of the same standard as it is, blocks having different heights can be applied.

The present invention is also a bumping post block for stopping a tire by installing on an installation surface, and includes a through-hole provided in an up-and-down direction by employing the anchor holder having the features described above.

It is preferable that the bumping post block be formed of concrete. After the block is placed at a predetermined installation location, the block is fixed with the anchor bolt being driven into the ground through the through-hole. Since the anchor holder of the present invention is used, the fittability and adhesion between the anchor bolt and the anchor holder is enhanced, so that even when there is a strong impact, such as when a tire hits the block, the anchor bolt will not jump up.

The present invention is a bumping post block, having a through-hole provided in an up-and-down direction. The block is fixed by inserting the anchor bolt therefrom into the installation surface, wherein a hole cap is provided, which fits the concave portion formed at the upper part of the through-hole, and when the hole cap is fitted onto the concave portion, the upper surface of the bumping post block body and the upper surface of the hole cap become flat, and at the same time, a reflector provided at the front of the hole cap is exposed at the front of the bumping post block body.

When the hole cap protrudes from the upper surface of the block as before, the cap hits the muffler and the bumper and the like, causing the muffler to be damaged and the hole cap to be detached from the bumping post and damaged and so on. According to the present invention, the upper surface of the hole cap and the upper surface of the block is flat and free from protrusions, therefore, there is no possibility that the muffler of a car and the like will contact with the hole cap. In addition, by providing a receptacle hole for the hole cap in the front surface of the block, when fitting a hole cap, on which a reflector is provided at the front, the cap can be made to act as a reflector.

The present invention is also directed to a hole cap, which is mounted on the upper part of a through-hole of the bumping post block having the through-hole provided in an up-and-down direction. The hole cap has an upper surface in the shape of a plane, a front part provided with a reflector and a cylindrical foot part.

The upper surface is in the flat-surface configuration so that the upper surface of the block and the upper surface of the cap can become flat when fitted on the head of the holder as mentioned above. And the foot part formed in the lower part is made to be cylindrical so as to lock the movement of the projection parts of the head of the holder being fitted. In addition, the configuration of the cross section of the foot part should be matched with that of the peripheral groove of the head of the holder and it can be circular or quadrangular or whatever. The hole cap according to the present invention can perform the above mentioned function by being used with the bumping post block and at the same time, can be a single part having both the application as the protection cap of the anchor holder as before and the application as a reflector.

The present invention is a bumping post including a bumping post block body, in which the anchor holder is embedded and a through-hole is provided in an up-and-down direction, an anchor bolt having the head part and being inserted from the through-hole into the installation surface so as to fix the block onto the ground and the hole cap.

Since the above mentioned bumper post block body of the present invention, which is embedded with the anchor holder of the present invention, and the hole cap are employed, the fittability and adhesion between the holder and the bolt is enhanced, the body can be firmly fixed onto the ground and provide an excellent crashproof structure.

The bumping post block also includes at least one insert, for inserting an auxiliary anchor, embedded in the base.

With the bumping post block according to the present invention, prior to installation, an auxiliary anchor is driven into the insert in advance, mounted by such as screwing, and after that, a bonding agent such as bond and mortar is filled into an embedded hole provided on the ground at a predetermined installation location, the protruded portion of the auxiliary anchor is embedded therein. Thus, the block can temporarily be tacked onto the installation location, and at the same time a stronger crashproof structure can be provided. As for the auxiliary anchor, reinforcing steel and a bolt can be employed.

The bumping post block of the present invention can have an indication part for performing an indication such as posting a name indication sticker onto a part of the inclined part provided at the front surface of the block, wherein the indication part has a configuration of a concave curved surface.

The indication part has a concave surface configuration in order to prevent the tire from contacting the name indication sticker and the like posted on the indication part. The curvature is set to be of a degree such that the tire of an assumable minimum standard (the tire of a light motor vehicle and the like) does not make contact. Thus, any tires of any standard having a larger size than the minimum standard cannot make contact with the indication part. Since tire contact is not possible, it can prevent letters on the posted sticker from wearing and the sticker itself from peeling. The configuration can be applied to the bumping post block described above.

According to the anchor holder, hole cap, bumping post block and bumping post of the present invention, adhesion between the anchor holder and anchor bolt is enhanced and the bumping post block and bumping post employing these features an excellent crashproof structure, and therefore, the anchor bolt does not jump up and damage the muffler and the like, and thus it is safe and excellent in durability.

BRIEF DESCRIPTION OF THE DRAWINGS

FIGS. 1(a)-(d) show a plan view, a cross sectional view, a side view and a bottom plan view of an anchor holder.

FIGS. 3(a)-(c) show a plan view, front elevation view and cross sectional view of the bumping post block.

DETAILED DESCRIPTION OF THE INVENTION

Figure 2:
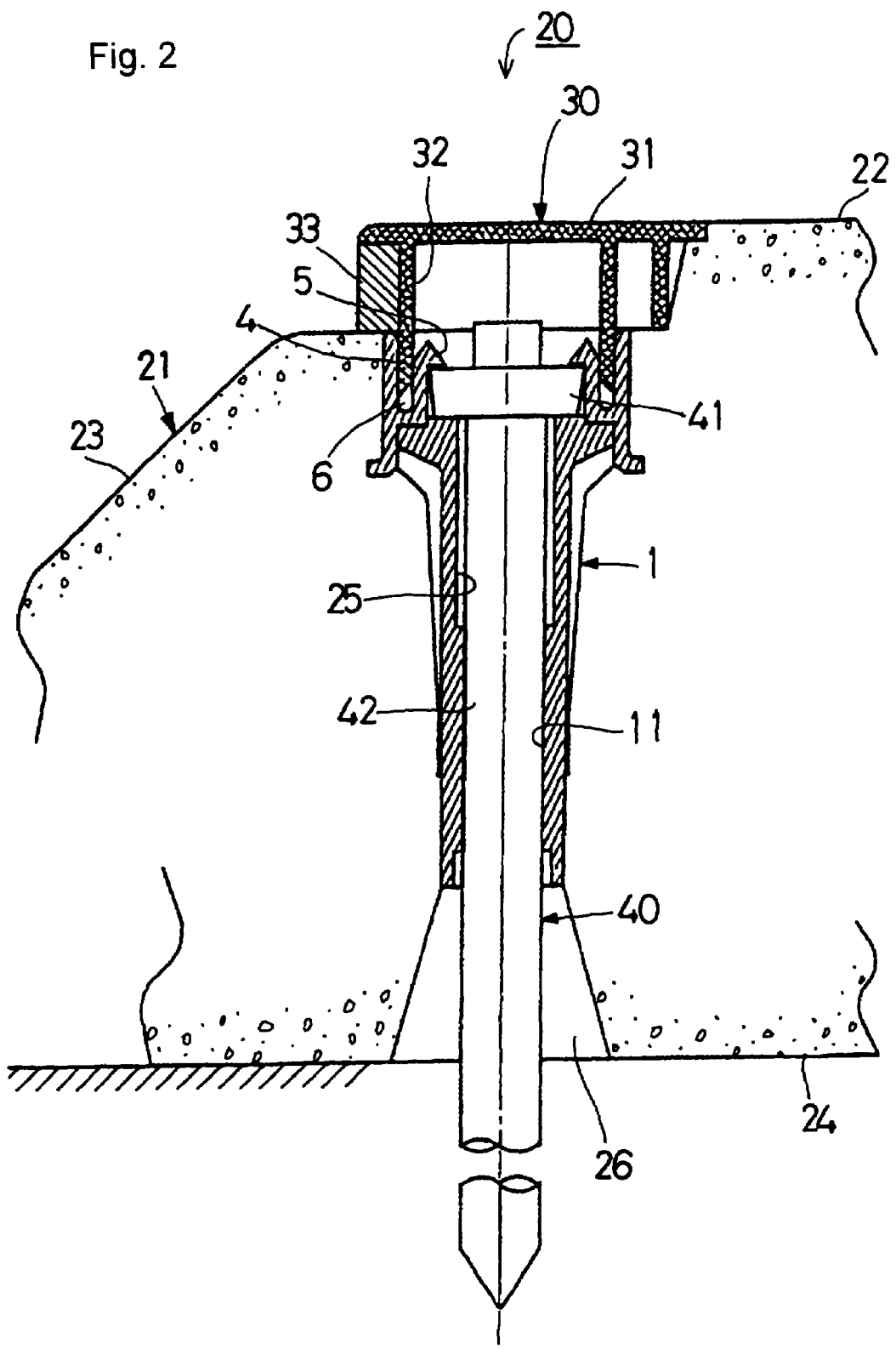
FIG. 2 is a cross sectional view of the bumping post.

A preferred embodiment of the present invention will be explained based on the drawings as follows. The anchor holder according to the embodiment of the present invention will be explained with reference to FIG. 1 and FIG. 2. The anchor holder of the present embodiment is made by using polypropylene. FIG. 1(a) is a plan view, FIG. 1(b) is a cross sectional view, FIG. 1(c) is a side view and FIG. 1(d) is a bottom plan view of the anchor holder 1 according to the embodiment of the present invention. As shown in the cross sectional view, the anchor holder 1 includes a head 2 and a cylinder 3. These can be formed as an integral unit, however, they can be combined after being made separately. In the present embodiment, the head 2 of the holder and the cylinder 3 of the holder are combined after being made separately. The head 2 of the holder comprises: projection parts 4 having an introverted protruding line 5 at an upper part, a peripheral groove 6 outside the projection parts 4, a peripheral wall 7, which is set up outside of the peripheral groove 6, and a flange part 8 around the lower edge of the peripheral wall. In the present embodiment, four projection parts 4 are erected, and arranged in such a way that, as shown in the plan view of FIG. 1(a), two pairs face each other. The space surrounded by the four projection parts 4 and located under the protruding line 5 is a receptacle hole 12 for the head of the bolt, and it is intended to include the head of the bolt when the anchor bolt is inserted. In addition, the peripheral groove 6 is a space to permit the projection parts 4 to be able to spread outwardly when the anchor bolt is inserted and the head of the bolt passes through. After insertion, by fitting a foot part of a hole cap thereon, movement of the projection parts 4 in a direction outside can be locked or prevented. Explanation of the inserting of the anchor bolt will be described later. In addition, the flange part 8, which his located at the lower edge of the head 2 of the holder is provided, so that, when the anchor holder is embedded in the block, the holder will not easily drop out of the concrete.

The cylinder (cylindrical portion) 3 of the holder comprises a cylinder body 14 and a neck 15 which is formed in a flange-fashion at the upper part and fitted into the head 2 of the holder. The inside of the cylinder body 14 serves as a receptacle hole 13 for receiving the shank when the anchor bolt is inserted. While an inner peripheral rib 11 is provided inside, a tapered rib 10 is provided outside, and is connected from a peripheral rib 9 on the lower surface of the neck 15 of the holder. The outer peripheral surface of the cylinder body 14 is tapered to provide a smaller diameter in the lower direction, thus, when the anchor bolt 40 is inserted, the downward force exerted on the cylinder 3 of the holder is transformed to a force to squeeze the cylinder inside, causing the cylinder 3 of the holder to tightly engage the anchor bolt 40. The inner peripheral rib 11 can be clearly seen in the plan view of FIG. 1(a) and the bottom plan view FIG. 1(b).

Since the internal diameter of the inner peripheral rib 11 is a little smaller than the diameter of the bolt shank 42 of the anchor bolt 40, when inserting the anchor bolt into the receptacle hole, the adhesion between the anchor bolt and the anchor holder is enhanced with the convex ribs being crushed. The outer peripheral ribs 9 function to reinforce the neck 15 of the holder supporting the head 2. The tapered ribs 10, connected to the above are tapered in a lower direction, and function to enhance the strength of the anchor holder as well. In addition, as shown in FIGS. 1 and 2, the outer diameter of the cylinder 3 of the holder, which is located just under the neck 15 of the holder forming the border between the head 2 of the holder and the cylinder 3 of the holder, is smaller than the outer diameter of the lower edge of the head 41 of the anchor bolt 40. As shown in FIG. 2, just under the outer edge of the head 41 of the bolt (the outside of the cylinder of the holder), the concrete breaks in. Thus, since the impact, caused by the driving-in of the anchor bolt, can be stopped not only by the resin part of the holder, but also by the concrete part just under the outer edge of the head 41 of the bolt, the strength of the anchor holder can be enhanced, and damage to the anchor holder can be prevented when the anchor bolt is being driven-in.

FIG. 2 is a bumping post according to the first embodiment of the present invention. The bumping post according to the present embodiment comprises: the anchor holder 1 according to the embodiment of the present invention shown in FIG. 1, the bumping post block 21 according to the embodiment of the present invention, in which the holder is embedded, the anchor bolt 40 inserted into the holder and a hole cap 30, which is fitted on the holder.

Initially, the bumping post block 21 according to the embodiment of the present invention will be explained. FIG. 3(a) is a plan view, FIG. 3(b) is a side view and FIG. 3(c) is a front elevation view of the bumping post block 21. As shown in the features, the bumping post block is almost a rectangular solid whose longitudinal sectional configuration is almost trapezoidal. Two receptacle holes 27 for the hole cap are provided on the upper surface 22 of the block and anchor holders 1 are embedded therein, respectively. Thus, the through-hole 25 is formed. There is an indication part 28 in a center of an inclined part 23, and provides a location for a name indication sticker to be posted thereon. In addition, it is possible to apply a bonding agent on the base 24.

The method of forming the bumping post block 21 is as follows. Firstly, a mold form (not shown) is set in such a way that the base becomes the upper side, which is a completed status. A protrusion is provided in advance in the mold form for forming the receptacle holes 27 for the hole caps, and since the head 2 of the anchor holder 1 can be jointed thereon, the anchor holder 1 is mounted at this part of the mold form being set. In the present embodiment, as shown in both FIGS. 3(a) and (b), two anchor holders 1 are attached to one block. In addition, the anchor holder is used for positioning of the anchor bolt to be inserted straight and by being closely stuck to the anchor bolt for enhancing the crashproof nature of the block itself. By embedding the anchor holder 1, as shown in both FIGS. 3(b) and (c), the through-hole 25 can be formed in the block 21. In the present embodiment, a boss for forming a spreading or diverging hole part 26 in the anchor holder 1 is attached at the tip of the cylinder 3 of the holder. After that, concrete is poured in the mold form, and after curing, the mold form is detached. Thus, the bumping post block 21 of the present embodiment can be produced, in which the anchor holder 1 is embedded.

FIG. 2 shows a state in which the bumping post block 21 of the embodiment of the present invention has the anchor bolt 40 inserted. The anchor bolt 40 is made entirely of metal and the head 41 of the bolt is integrally molded by a method such as forging. The anchor bolt can be driven into the installation surface by, for example, the blow of a hammer or by driving the bolt in using a driving machine such as a hammer drill. It is necessary that the anchor bolt 40 should be driven in to such a degree that it penetrates sufficiently through the bumping post block 21 to reach the ground below so as to be fixed. The bolt's length should be longer than the height of the block. The drive-in scrap produced while driving can be accommodated in the spreading or expanded hole part 26 of the block 21. Thereby, the block 21 can be prevented from being lifted from the ground by the drive-in scrap. Additionally, in consideration of an easy driving-in operation, the anchor bolt according to the present embodiment has a sharp-pointed configuration.

When the anchor bolt is initially driven in, the shank 42 of the bolt is inserted and crushes the inner peripheral ribs 11 of the cylinder of the holder. Thereby, adhesion between the holder and the bolt is enhanced. Then, at the stage when the head 41 of the bolt passes through the projection parts 4, since the head 41 of the bolt goes through the part of the protruding line 5, the projection parts 4 spread outwardly. And after the head 41 of the bolt passes through the projection parts 4, they restore to their original positions due to elasticity. Thus, the head 41 of the bolt is set in the space of the receptacle hole 12 for the head of the bolt in the head 2 of the holder. Thereby, the head 41 of the bolt is held down from above by the protruding line 5, and therefore, the head 41 of the bolt does not jump up over the projection parts 4. As shown in FIG. 2, by fitting the foot part 32 of the hole cap 30 into the peripheral groove 6 of the head 2 of the holder, the tendency of the projection parts 4 to spread outward is suppressed, which prevents the head 41 of the bolt from jumping up all the more.

As shown in FIGS. 2 and 7, the hole cap 30 according to the present invention comprises an upper surface 31, the foot part 32 and a reflector 33. As mentioned above, the hole cap 30 is applied by fitting the peripheral groove 6 of the head 2 of the holder with the foot part 32. The upper surface 31 of the cap has a flat-surface configuration, and being fitted onto the head 2 of the holder, the upper surface 31 of the cap and the upper surface 22 of the block form a flat surface. The cap does not protrude from the upper surface of the block, so that when a tire hits the block, the car body such as the muffler will not be damaged and the cap is not damaged. In addition, a well-known reflecting mirror is used for the reflector fixed on the front surface, which enables drivers to notice the presence of the block by the reflection of the headlights of the car in the dark. Thus, the hole cap 30 of the present invention performs multiple functions by itself. FIGS. 7(a)-(d) show various view of the hole cap.

Further, the bumping post 20 according to the present embodiment can be fixed on an installation surface by well-known methods such as a method, in which a well-known anchor member having a slip stopping function at the tip of the anchor bolt is attached and fixed.

In order to establish the bumping post 20 according to the present embodiment, at first, a bonding agent is applied to the base of the bumping post block 21, which is then placed at a predetermined installation location and temporarily fixed. Next, into the through-hole 25 of the anchor holder 1, the anchor bolt 40 is inserted from above, and is driven into the installation surface using a driving device such as a hammer drill. When the driving-in operation is furnished, the head 41 of the bolt is housed in the receptacle hole 12 and the condition in FIG. 2 is realized. After that, when the hole cap 30 is fitted, the operation is concluded. By performing the above operations for each of the two anchor holders, the bumping post 20 is fixed onto the installation surface.

Figure 4:
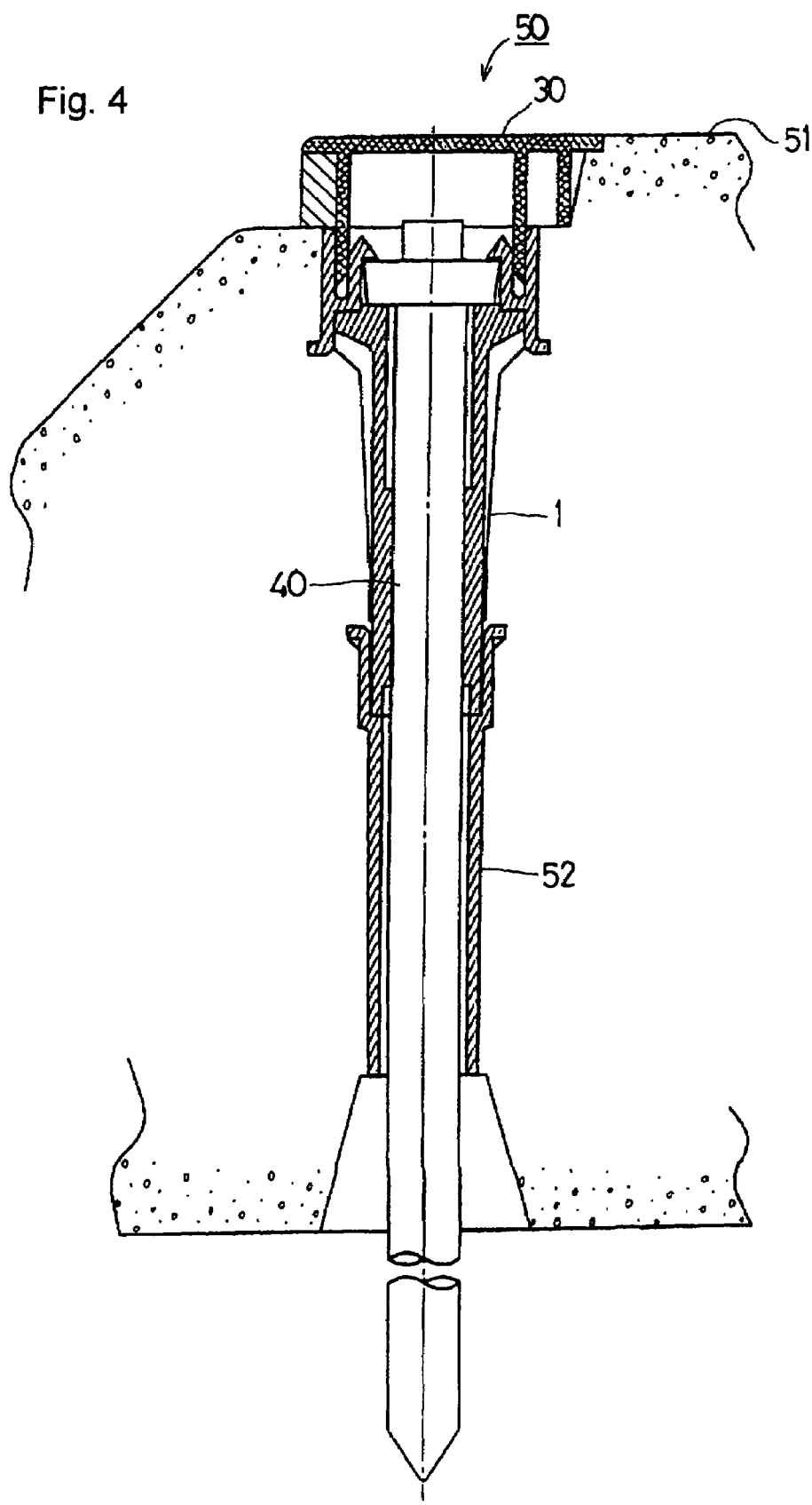
FIG. 4 is a schematic diagram of another embodiment of a bumping post.

As shown in FIG. 4, the bumper post 50 and the bumping post block 51, in which a cylindrical joint part 52 is connected to the anchor holder 1 and embedded to form a through-hole in an up-and-down direction, is fixed by the anchor bolt 40 onto the installation surface and the hole cap 30 is installed. The height of the bumping post block is usually 120 mm, and since the anchor holder 1 according to the embodiment of the present invention is produced to meet this, for blocks having a larger height, by employing joint parts, which meet the height of the block, it is possible to accept blocks having different heights. The basic anchor holder 1 can have an identical configuration, therefore, it can be applied in many situations. Moreover, the joint part 52 is externally fitted and jointed at the tip of the anchor holder 1, however, as long as it can extend the height, any configuration of jointing is allowable. With the exception of the jointing of the joint parts, the bumper post 50 is the same as the above mentioned bumping post 20.

Figure 5:
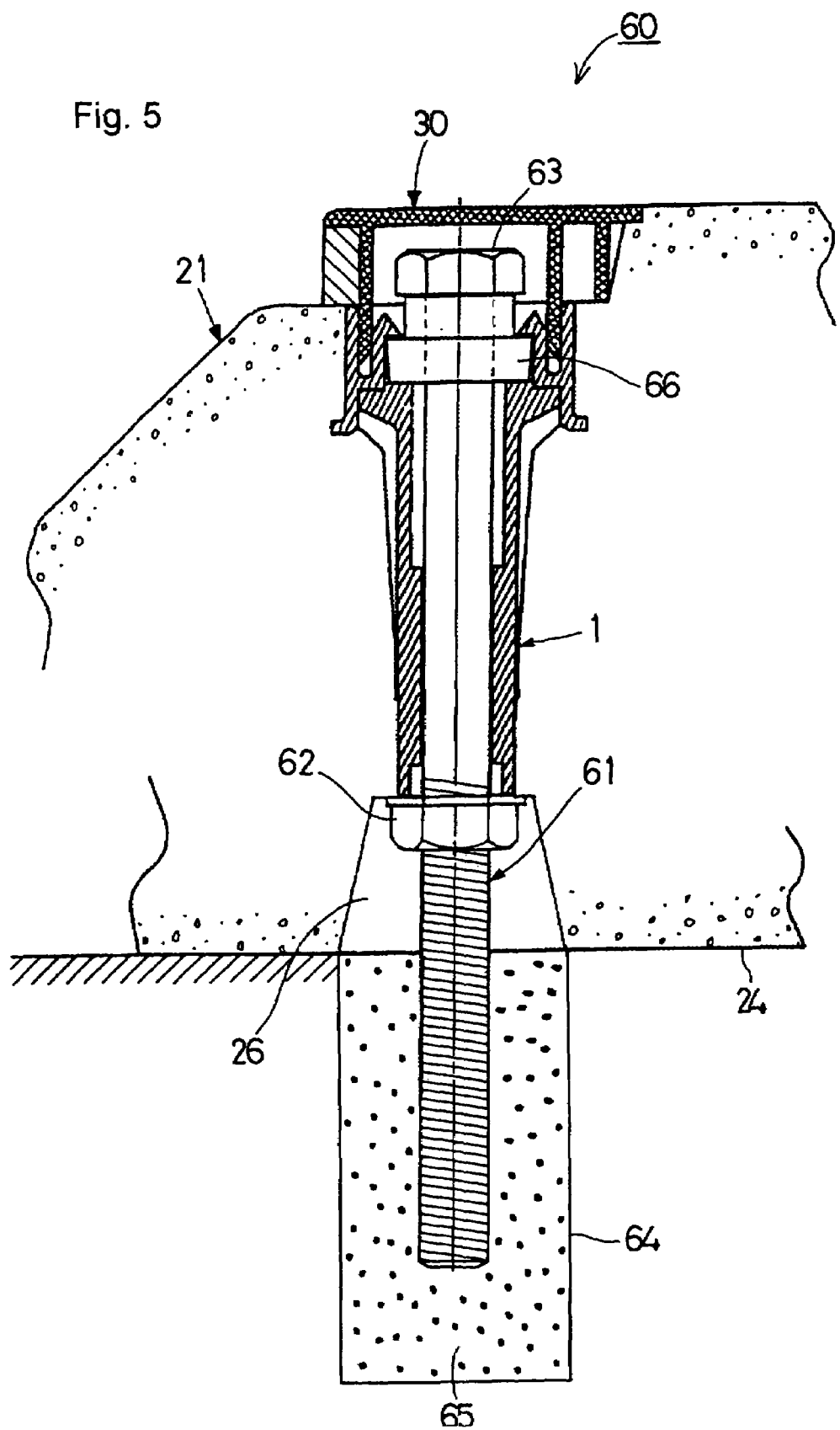
FIG. 5 is a schematic diagram of another embodiment of a bumping post.

As for the method of fixing the bumping post except for the above, a method can be adopted, in which the anchor bolt is not driven in from above. In this fixing method, the bumping post block and hole cap according to the above embodiment are available. As shown in FIG. 5, before placing the bumping post block 21 at the installation location, the anchor bolt 61 is inserted into the anchor holder 1. The anchor bolt 61 is a regular metal bolt having a hexagonal head 63, and in this case, the plastic head 66 of the bolt is provided so as to be slidably fitted. Since this construction method is not intended for driving the anchor bolt into the installation surface, the plastic head can be sufficient in view of the strength. After the head 66 of the bolt is set right into the receptacle hole 12 the anchor bolt 61 is tightened with a nut 62 from the spreading hole part 26 of the bumping post block 21. By tightening from below by the nut, the anchor bolt 61 is fixed in the anchor holder 1. After tightening with the nut, at a predetermined installation location of the bumping post, an embedded hole 64 is provided for embedding the end of the bolt, which is protruded from the base 24 of the block 21. A bonding agent such as mortar 65 can be used to embed the end of the bolt in the hole 64. This fixing method also allows the bumping post block to be firmly fixed onto the ground and enables the effects of the invention to be obtained due to the structure of the anchor bolt according to the present invention, and therefore, the block is effectively crashproof. Since the anchor bolt is fixed on the bumping post block, there is no possibility that the bolt will jump out of the block due to impact.

Figure 6:
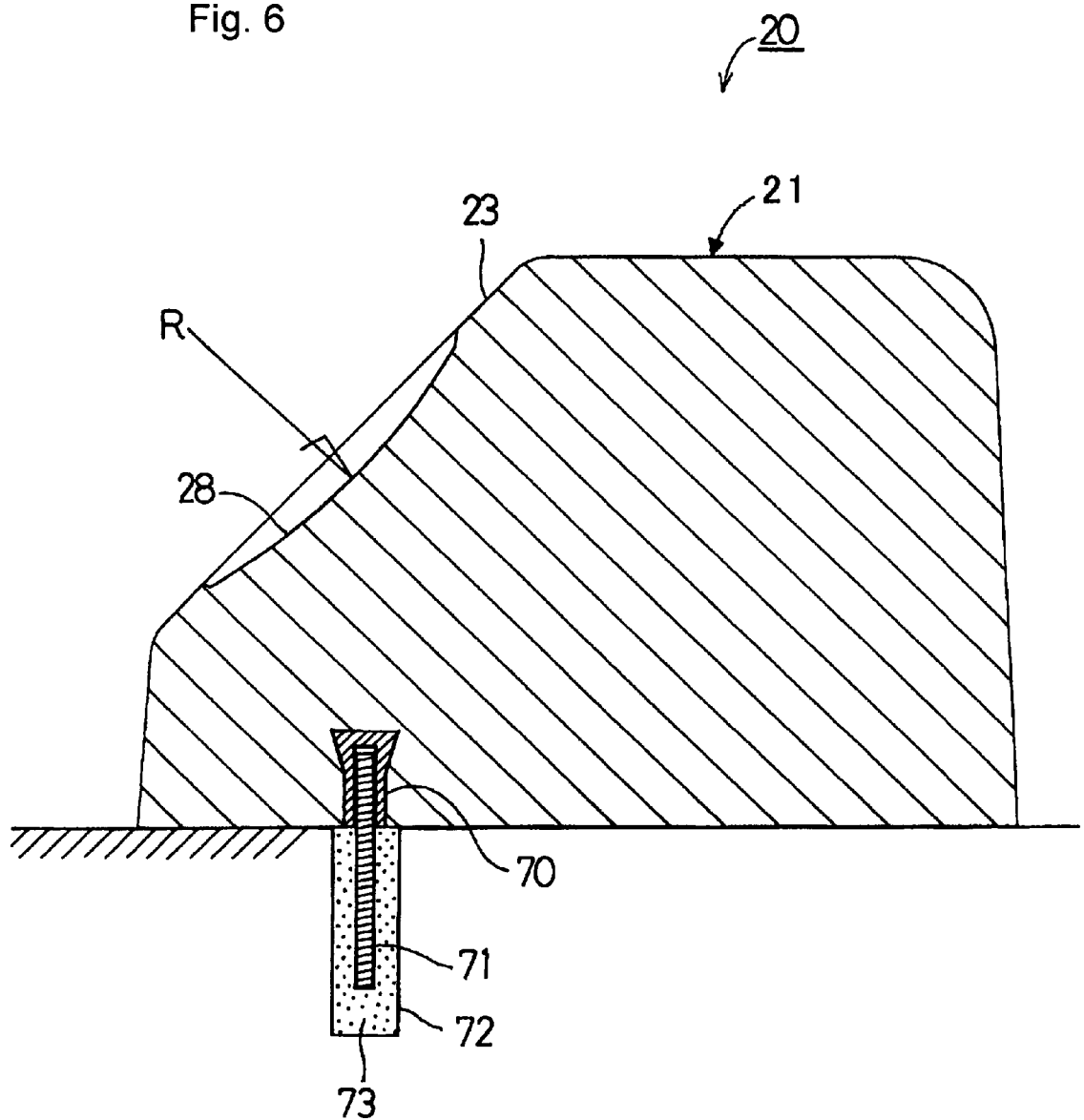
FIG. 6 is a central longitudinal sectional view of a bumping post block.
Figure 7A:
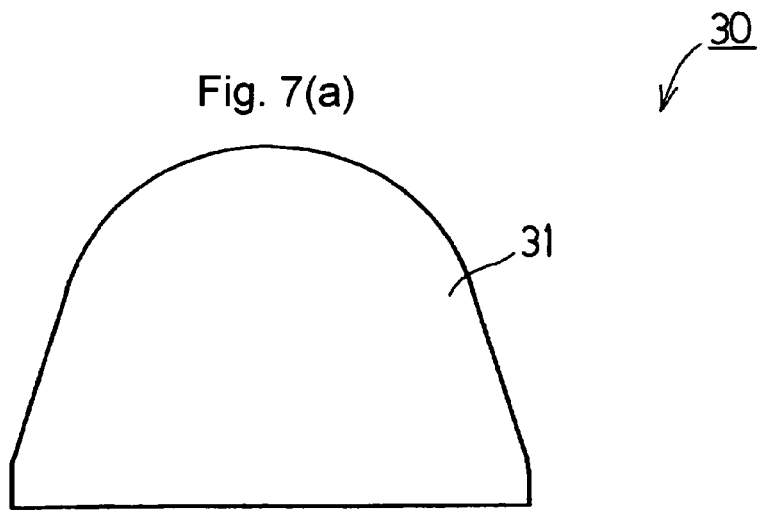
FIGS. 7(a)-(d) show a plan view, front elevation view, bottom plan view and side view of a hole cap.
Figure 7B:
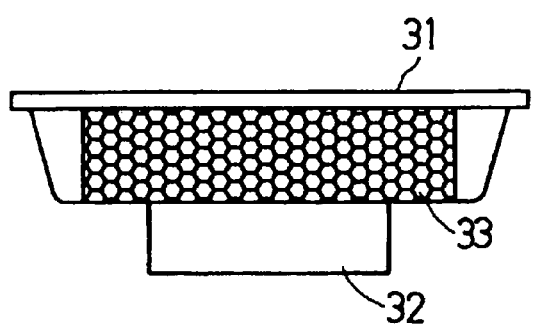
Figure 7D:
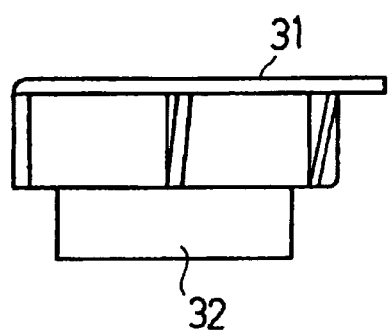
Figure 7C:
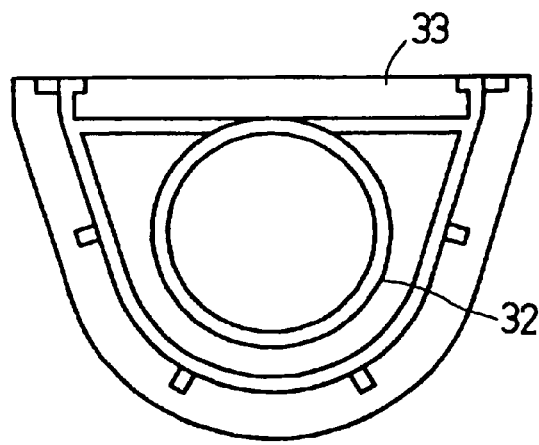

FIG. 6 shows a central longitudinal sectional view of the bumping post block 21. The indication part 28, formed at the center of the inclined part 23, has a configuration of a concave curved surface. By setting the radius R of curvature of the concave curved surface of the indication part 28 in the longitudinal section to be such a degree that the tire of an assumable minimum standard of cars does not make contact (radius of curvature smaller than the minimum radius of a tire), tires of most cars cannot make contact with the indication part. Usually a name sticker and the like are posted on this part. Thereby, letters on a posted sticker will be resistant to wear and the sticker itself becomes harder to peel.

As shown in FIG. 6, in the bumping post block 21, a plastic-made insert 70 for mounting an auxiliary anchor 71 is embedded at the center of the base. The auxiliary anchor is mounted if necessary, and it permits installation of the bumping post block without permanently mounting it. When mounting the auxiliary anchor, prior to the installation of the block 21, the auxiliary anchor 71 is driven into the insert 70 in advance, such as by screwing-in. Then the protruded portion of the auxiliary anchor 71 is embed into the embedded hole, which is provided in a predetermined installation surface and the holes is then filled with a bonding agent 73 such as bond and mortar. Thus, the block can be temporarily fixed to the installation location, and at the same time a stronger crashproof structure can be provided. As for the auxiliary anchor, members such as reinforcing steel and the bolt can be employed.

The invention claimed is:

1. An anchor holder for receiving an anchor bolt in a vertical direction in a curb block to fix a position of the curb block, the anchor holder comprising:
   a generally cylindrical portion for receiving a shank of the anchor bolt; and
   a head portion positioned at an upper end of the cylindrical portion for containing a head of the anchor bolt, said head portion having a plurality of projecting parts forming an inwardly protruding ledge for contacting an upper surface of the head of the anchor bolt so as to prevent the anchor bolt from being displaced in an upward direction.

2. The anchor holder as claimed in claim 1, wherein said head portion further comprises an outer peripheral wall surrounding said projecting parts and being spaced apart from said projecting parts so as to define a peripheral groove between said outer peripheral wall and outer surfaces of said projecting parts, said peripheral groove being shaped so as to be able to receive a foot part of a hole cap.

3. The anchor holder as claimed in claim 1, further comprising:
   ribs provided on an inner wall of said cylindrical portion, said ribs extending in an axial direction of said cylindrical portion.

4. The anchor holder as claimed in claim 1, further comprising:
   a neck part between said head portion and said cylindrical portion, wherein an outer diameter of said cylindrical portion at a lower end of said neck part is smaller than an outer diameter of a lower end of the head of the anchor bolt.

5. The anchor holder as claimed in claim 1, wherein an outer diameter of said cylindrical portion is reduced in a downward direction such that an outer periphery of said cylindrical portion is tapered in the downward direction.

6. The anchor holder as claimed in claim 1, further comprising a cylindrical joint part connected to a lower end of said cylindrical portion.

7. The anchor holder according to claim 1, wherein said head portion has a cylindrical shape and is positioned so as to be coaxial with said cylindrical portion, and wherein said projecting parts are arranged along a circumferential direction of said head portion so as to be spaced apart from each other in the circumferential direction of said head portion.

8. A concrete curb post block for stopping a tire when installed on an installation surface, comprising:
   a through-hole oriented in a vertical direction; and
   an anchor holder embedded in said through hole for receiving an anchor bolt for fixing the concrete curb block on the installation surface, wherein said anchor holder includes
      a generally cylindrical portion for receiving a shank of the anchor bolt, and
      a head portion positioned at the upper end the cylindrical portion for containing a head of the anchor bolt, said head portion having a plurality of projecting parts for overlying an upper surface of the head of the anchor bolt when inserted therein.

9. The concrete curb block according to claim 8, wherein said head portion has a cylindrical shape and is positioned so as to be coaxial with said cylindrical portion, and wherein said projecting parts are arranged along a circumferential direction of said head portion so as to be spaced apart from each other in the circumferential direction of said head portion.

10. The concrete curb block as claimed in claim 8, wherein said head portion comprises an outer peripheral wall surrounding said projecting parts and being spaced apart from said projecting parts so as to define a peripheral groove between said outer peripheral wall and outer surfaces of said projecting parts, said peripheral groove being shaped so as to be able to receive a cylindrical foot part of a hole cap.

11. The bumping post block as claimed in claim 8, further comprising ribs provided on an inner wall of said cylindrical portion, said ribs extending in an axial direction of said cylindrical portion.

12. The concrete curb block as claimed in claim 8, wherein said anchor holder further includes a neck part between said head portion and said cylindrical portion, and wherein an outer diameter of said cylindrical portion at a lower end of said neck part is smaller than an outer diameter of a lower end of the head of the anchor bolt.

13. The concrete curb block as claimed in claim 8, wherein an outer diameter of said cylindrical portion is reduced in a downward direction such that an outer periphery of said cylindrical portion is tapered in the downward direction.

14. The concrete curb block as claimed in claim 8, further comprising a cylindrical joint part connected to a lower end of said cylindrical portion.

15. The concrete curb block as claimed in claim 8, further comprising:
   at least one insert for receiving an auxiliary anchor, said at least one insert being embedded in a base portion of said concrete curb block.

16. The concrete curb block as claimed in claim 8, further comprising an indication part for receiving indicia thereon, said indication part being located on an inclined front surface of said concrete curb block, wherein said indication part is configured so as to define a concave portion of said inclined front surface.

* * * * *